United States Patent Office 2,934,481
Patented Apr. 26, 1960

2,934,481

PROMOTION OF CHEMICAL REACTIONS

Simon L. Ruskin, New York, N.Y., assignor to Union Carbide Corporation, New York, N.Y., a corporation of New York No Drawing. Application November 17, 1954
Serial No. 469,550

9 Claims. (Cl. 204—158)

The invention relates to the promotion of chemical reactions, and more particularly to the promotion of oxidation and reduction reactions and dehydrogenation.

Many chemical reactions are difficult to promote, such as the reduction of certain metallic oxides and the oxidation of certain organic substances, as in the production of organic hydroperoxides. Furthermore, the control of such oxidation procedures so that oxidation ceases at precisely the desired point is often difficult.

The primary object of the present invention is to provide a procedure for carrying out certain chemical reactions, especially oxidation and reduction reactions and dehydrogenation in a simple and effective manner.

Another object of the invention is to carry out oxidations and reductions simultaneously, so as to obtain two desirable end products by a single procedure.

A further object of the invention is to provide a procedure in which the reactions are carried out at relatively low temperatures and dehydrogenation effected.

I have discovered that when an oxide or oxygen-yielding material, particularly a difficultly reducible metal oxide, is subjected in the presence of an oxidizable organic substance to gamma radiation, as in an atomic pile or a cobalt bomb, the oxygen-containing material will be reduced and the organic material will be oxidized. The degree of reduction will depend on the energy imparted to the mixture, but ordinarily from 10,000,000 to 400,000,000 Roentgen units per gram are necessary for effective results. The degree of oxidation of the organic compound will also depend on the amount of oxygen present in the oxygen-yielding compound, or, in other words, on the proportions of the two materials in the mixture. By suitably varying these proportions, the degree of oxidation can be likewise controlled.

The procedure in its most desirable aspect provides a method of reducing oxides of difficultly reducible metals, such as titanium, germanium, zirconium, hafnium, thorium, vanadium, columbium, tantalum, molybdenum, tungsten and uranium, in other words, metals of groups IV to VII of the periodic system. It is also useful in connection with oxides of gallium, indium, thallium, selenium and tellurium.

However, where only oxidation is desired, other inorganic oxygen-containing compounds may be used. Even water will produce oxidation under proper conditions, especially if small amounts of metal oxide catalysts (as 0.1% to 2% of an oxide of vanadium, chromium, iron, platinum, palladium, nickel, cadmium, zinc or cobalt) are present in the mixture.

Any oxidizable organic compound appears to be usable as the second ingredient. For example, acetic acid can be converted to acetyl peroxide or to citric acid, depending on the degree of oxidation; benzene to benzoyl peroxide; formic acid to formic hydroperoxide; and the like.

However, it is preferable to use as the oxidizable organic compound one which has either an aldehyde or a hydroxyl group.

Among the useful organic materials are glycerol and sugars, such as dextrose or glucose, even in the form of raw molasses, lactose, mannose, gelactose and starch. Other materials are pyridine, piperidine, pyrrholes, indoles, furanes, quinolines, steroids, phenols, quinones, and xylenes, from which peroxides or hydroperoxides can be produced.

The process can be carried out in the presence of a liquid, or by admixture of the ingredients in finely divided solid form.

Examples of my process are as follows:

*Example I*

Equal proportions of finely divided titanium oxide and glycerol are subjected to radiation in a cobalt bomb equivalent to 100,000,000 Roentgen units per gram. The resulting products are titanium metal and a mixture of products, mostly glyceric acid. The metal is filtered from the other products, washed and dried.

The same procedure can be applied to other metals, especially those listed above.

*Example II*

360 g. of acetic acid and 240 g. of titanium oxide ($TiO_2$) are subjected to 100,000,000 Roentgen units per gram. Titanium metal, citric acid, methane, acetylene, hydrogen and water are produced.

*Example III*

A 50% aqueous solution of acetic acid containing 1% vanadium oxide ($V_2O_5$) is subjected to 100,000,000 Roentgen units per gram. Acetyl peroxide is the principal product as well as small amounts of methane, hydrogen, acetylene and citric acid.

I have further discovered that certain materials, especially boron and its compounds, appear to act as partial inhibitors and may be added to regulate the degree of oxidation.

Another function accomplished by my irradiation with 100,000,000 to 400,000,000 Roentgen units per gram is the creation of heterogeneous equilibrium between various metals and metal oxides whereby alloy systems are readily formed. In some instances eutectic compounds are created which provide improved ductility, greater hardness and varying degrees of mixed properties of different metals. Thus it is possible to make silicon complexes with the rare metals such as titanium, chromium, molybdenum, tantalum, zirconium, uranium, vanadium, tungsten, germanium, indium, hafnium, nickel, platinum, silver, copper, aluminum and mercury. Also, the disilicides may be readily formed.

While such compounds hitherto have had to be formed at high temperatures up to 2500° C., I have found that under 100,000,000 to 400,000,000 Roentgen units per gram such compounds form readily after such mild heating as 150° C. to 300° C.

*Example IV*

50 grams of titanium oxide and 50 grams of silicic acid are mixed and suspended in 100 cc. $H_2O$ and subjected to 100,000,000 Roentgen units per gram. The mixture is now heated to 200° C. The disilicide of titanium and titanium oxide is readily formed to approximately 80% of theoretical.

*Example V*

50 grams of titanium oxide and 50 grams of tungsten oxide were mixed with 100 grams of carbon suspended in water and irradiated to 100,000,000 Roentgen units per gram. On heating to 300° C. a heterogeneous equilibrium was readily established between titanium, tungsten and carbon.

Example VI 50 grams of zirconium oxide and 50 grams of nickel oxide were suspended in 100 grams H₂O and irradiated to 200,000,000 Roentgen units per gram. On heating to 200° C. a heterogeneous equilibrium was established between the zirconium and the nickel.

Example VII 50 grams of zirconium oxide and 50 grams of lead oxide were suspended in 100,000,000 cc. H₂O and irradiated to 100,000,000 Roentgen units per gram. On heating to 150°–200° C. a heterogeneous equilibrium was established and the possible compound $Zr_5Pb_3$. Other similar combinations of heterogeneous equilibrium between and with zinc and tin, copper, manganese, cobalt, mercury, antimony, may be formed.

Where silicon heterogeneous equilibrium is established with metals, it becomes possible to impart metallic properties to silicon complexes such as glass, particularly fibre glass, silicone oils, waxes and paints. The incorporation of such metals as mercury, bismuth, antimony, lead, and such metalloids as arsenic make possible bactericidal and fungistatic paints particularly useful in the painting of ship bottoms. Thus, the frequency of such pointings can be greatly reduced. Where lithium is in heterogeneous equilibrium with silicone, temperature resistant oils may be produced.

Another valuable field of oxidation and reduction induced by gamma radiations in the range of 10 to 200 million Roentgen units per gram is the treatment of flour from wheat, corn, soy, cottonseed meal, peanuts, potato and yeast to improve the taste. Many of these flours have a bitterness due both to biogenic amines and insoluble carbohydrates. The oxidation of the amines does away with the bitterness from that source and the insoluble carbohydrates particularly in soy and cottonseed meal (particularly gossypol in the latter) are made soluble by the irradiation and thus less irritating to the intestinal tract.

Example VIII 100 grams of soy flour are irradiated with 100,000,000 Roentgen units per gram and used in the customary manner for baking.

Example IX 100 grams of cottonseed meal are irradiated with 100,000,000 Roentgen units per gram and fed to chickens mixed with a vitamin supplement.

Other examples in accordance with my invention are as follows:

Example X 50 grams lead diacetate in 200 cc. acetic anhydride is irradiated with 40 million Roentgen units per gram. Lead tetracetate is formed in approximately 60% of theory. The reaction may be further catalyzed by a small amount of hydrogen peroxide.

Example XI

To 50 grams of gulonic acid in 100 cc. water is added 0.5 g. vanadium pentoxide. The product was exposed to 100,000,000 Roentgen units per gram in a cobalt bomb. The end product yielded 60% 2-keto gulonic acid.

Example XII

To 50 grams of sodium gulonate and 50 grams of sodium idonate is added in aqueous suspension 0.5 gram vanadium pentoxide. The whole was irradiated to 10 million Roentgen units per gram. 40% of sodium 2 keto-gulonate was recovered. Higher yields were attained in the addition of 2 grams $KClO_3$.

Example XIII 200 cc. crude petroleum was irradiated with 40,000,000 Roentgen units per gram in a partially closed container. A fine precipitate formed which could be filtered off. The precipitate was elemental sulphur. The odor of $H_2S$ and mercaptans had markedly diminished. There was an increased odor of methane.

Still another valuable field of oxidation and reduction induced by gamma radiations in the range of 10 to 200 million Roentgen units per gram is the treatment of starch, such as corn starch or starch of other plant sources as potato, tapioca and wheat.

I have found that starch in the presence of small amounts of water and an oxidation catalyst such as vanadium pentoxide or hydrogen peroxide undergoes a profound change in granular structure somewhat similar to the action of alpha amylase, yet not quite the same. There appears to be an opening of the chain and cross linkages with branching effected after gamma radiation in the range of 10,000,000 to 100,000,000 R. The starch becomes soluble in cold water and on standing the solution assumes a pale haze slightly colloidal in nature. Only a very little sediment tends to form on standing after 24 hours. When compared with untreated starch, or so-called soluble starch made by acid treatment, the properties are quite different. My treated starch is far more soluble and on treatment with iodine gives a bluish-red coloration and clear solution, whereas the untreated starch gives a purple or blackish-purple color and tends to form a flocculant precipitate. This is adequate proof that the starch granules have been modified and irreversibly changed. The granules have apparently been opened and will become readily subject to hydrolysis. This change is extremely useful in the laundry and textile industry, as well as the food industry for quick baking and quick puddings. By my procedure I produce also, to some extent, an oxystarch. Films from my starch are brittle and particularly useful to incorporate in chocolate.

Example XIV

To 100 grams of corn starch is added 100 cc. of water and ½ gram $V_2O_5$. The whole is irradiated with 100 million gamma Roentgen units. A pale greenish paste results. On centrifugation, a pale green liquid can be separated leaving a very pale paste. Five grams of this paste suspended in 20 cc. of water gives a whitish solution practically free from color and having a whitish haze which persists somewhat as a colloidal suspension. Instead of the ½ gram of $V_2O_5$, traces of the $V_2O_5$ is sufficient to induce the above reaction. Instead of the vanadium pentoxide, a small amount of potassium chlorate may be used, or hydrogen peroxide ($H_2O_2$).

While oxidation and reduction processes have been described in the preceding examples, I have found that dehydrogenations likewise are effected by gamma radiations between 10 million R. and 400 million R. Thus the irradiation of propane by 100 million R. leads to the formation of methane, hydrogen and acetylene. In employing gamma radiation of organic compounds, it is customary that several organic intermediates result. I have found that these can be fractionally separated by selective solubilities in water or organic solvents as in the case of gases or chemically by fractional crystallization, fractional precipitation, or separation by the use of organic solvents, chromatographic separation or other means known to chemists.

I have found that when propane is converted to methane, hydrogen and acetylene that the solubility in water of acetylene is so great that it can be readily separated from the methane and hydrogen by passing the gases through water whereby the acetylene is absorbed a thousand fold more than hydrogen and several hundred times more than methane. It thus becomes immediately possible to separate the acetylene from the products of the irradiation.

The solution of acetylene in water may then be readily separated by allowing the acetylene to escape from the water under slightly reduced pressure or if desired the acetylene may be bottled in water under a pressure of 500 pounds.

I have found that this bottled acetylene in water is a new product of great utility where vapor pressure for many purposes is required. Thus my acetylene water may be employed to recover petroleum from old wells where there is residual oil that will not rise in the well. By injecting quantities of my acetylene water under 500 lbs. pressure into the pockets of oil reserve surrounding the well, the great pressure exerted by the acetylene as it leaves the water forces the oil from the captive pockets toward the well and forcing it to emerge.

My acetylene water may also be used for any purposes for which acetylene is employed since it separates readily from the water. While I prepare my acetylene water from the products of the irradiation of propane, it may also be prepared from the chemical degradation of propane. Instead of propane I may employ other hydrocarbon chains.

*Example XV*

A liter of propane is irradiated in a cobalt bomb with 100 million R. The formed gases are led into a water bottle containing 2 liters of water and shaken for five minutes under moderate pressure. The remaining gas is taken off under atmospheric pressure. The acetylene is absorbed in the water and the methane and hydrogen led off to a tank and stored for use as fuel.

While I have described herein some embodiments of my invention, I wish it to be understood that I do not intend to limit myself thereby except within the scope of the claims hereto or hereinafter appended.

I claim:

1. The method for simultaneously promoting the reduction of a metallic oxide selected from the group consisting of the oxides of titanium, germanium, zirconium, hafnium, thorium, vanadium, thallium, columbium, tantalum, molybdenum, tungsten, uranium, gallium, indium, selenium, tellurium; and the oxidation of acetic acid which comprises subjecting said metallic oxide and acetic acid to gamma radiation in the range of between 10,000,000 to 400,000,000 Roentgen units per gram.

2. The method for simultaneously promoting the reduction of a metallic oxide selected from the group consisting of oxides of titanium, germanium, zirconium, hafnium, thorium, vanadium, thallium, columbium, tantalum, molybdenum, tungsten, uranium, gallium, indium, selenium, tellurium; and the oxidation of a member selected from the group consisting of acetic acid and glycerol, which comprises subjecting said metallic oxide and said member to gamma radiation in the range of 10,000,000 to 400,000,000 Roentgen units per gram.

3. The method for simultaneously promoting the reduction of titanium oxide and the oxidation of glycerol which comprises subjecting said titanium oxide and said glycerol to gamma radiation in the range of 10,000,000 to 400,000,000 Roentgen units per gram.

4. The method for simultaneously promoting the reduction of titanium oxide and the oxidation of glycerol which comprises subjecting said titanium oxide and said glycerol to gamma radiation of about 100,000,000 Roentgen units per gram.

5. The method for simultaneously promoting the reduction of a metallic oxide and the oxidation of a member selected from the group consisting of acetic acid and glycerol which comprises subjecting said oxide and said member to gamma radiation in the range of 10,000,000 to 400,000,000 Roentgen units per gram.

6. The method for simultaneously promoting the reduction of a metallic oxide selected from the group consisting of the oxides of titanium, germanium, zirconium, hafnium, thorium, vanadium, thallium, columbium, tantalum, molybdenum, tungsten, uranium, gallium, indium, selenium, tellurium, and the oxidation of an oxidizable organic material selected from the group consisting of carboxylic acids, alcohols, and heterocyclic and hydrocarbyl aromatic compounds, which comprises subjecting said metallic oxide and said oxidizable organic material to gamma radiation in the range of 10,000,000 to 400,000,000 Roentgen units per gram.

7. The method for simultaneously promoting the reduction of a metallic oxide and the oxidation of acetic acid which comprises subjecting a metallic oxide and acetic acid to gamma radiation in the range of 10,000,000 to 400,000,000 Roentgen units per gram.

8. The method for simultaneously promoting the reduction of a metallic oxide and the oxidation of acetic acid which comprises subjecting 2 parts of acetic acid and 3 parts of titanium oxide to gamma radiation of about 100,000,000 Roentgen units per gram.

9. The method for simultaneously promoting the reduction of a metallic oxide and the oxidation of acetic acid which comprises subjecting 2 parts of acetic acid and 3 parts of titanium oxide to gamma radiation within the range of 10,000,000 to 400,000,000 Roentgen units per gram.

References Cited in the file of this patent

UNITED STATES PATENTS 2,350,330    Remy _____ June 6, 1954

FOREIGN PATENTS 665,263    Great Britain _____ Jan. 23, 1952
282,096    Switzerland _____ Apr. 15, 1952

OTHER REFERENCES

Stein et al.: Journal Chem. Soc. (1949), pp. 3245–3254.

Nature, vol. 170 (Dec. 20, 1952), pp. 1075–1076.